UNITED STATES PATENT OFFICE.

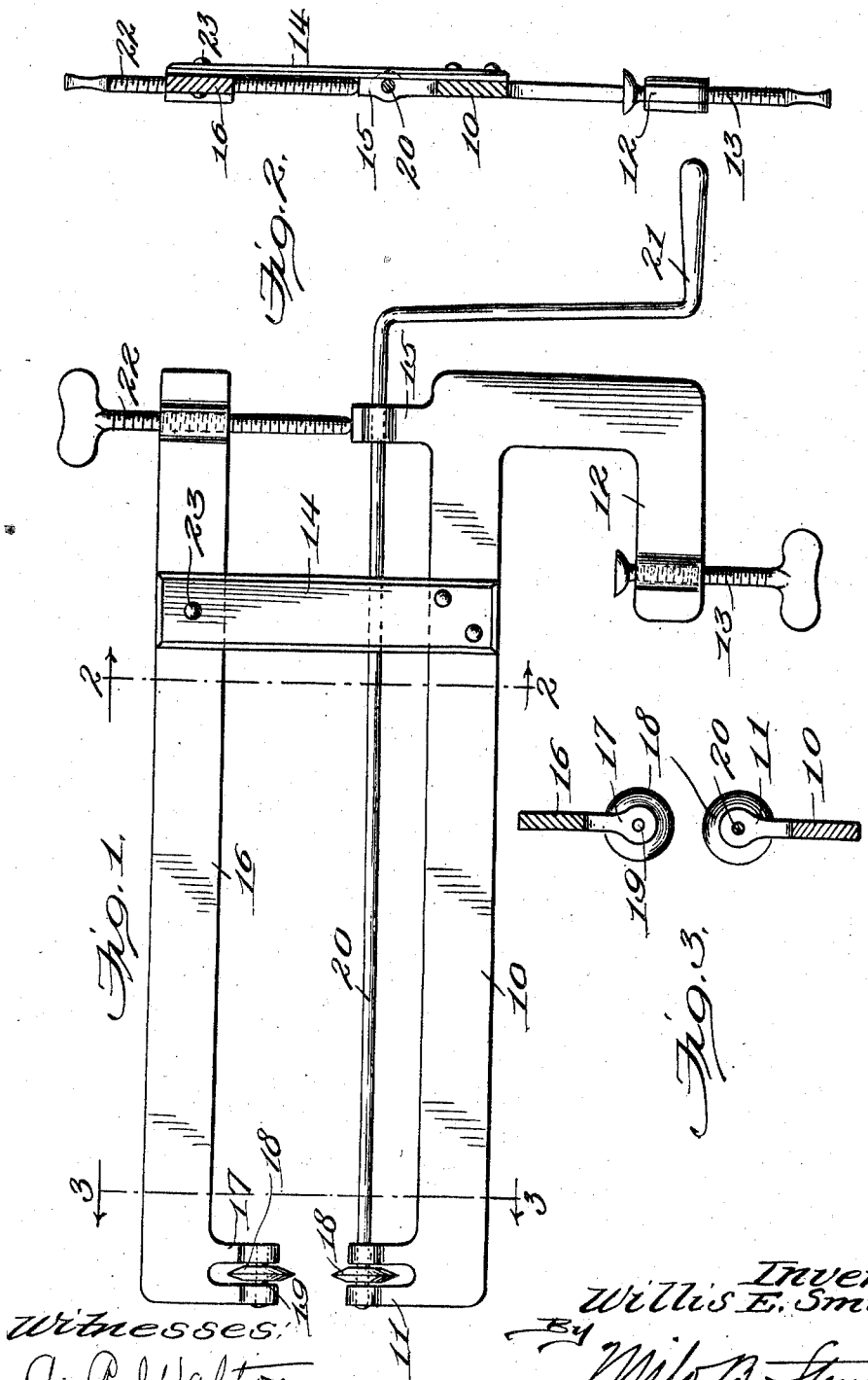

WILLIS E. SMITH, OF OWENSBORO, KENTUCKY, ASSIGNOR OF ONE-HALF TO EDWARD BOWNE, OF CLOVERPORT, KENTUCKY.

TILE-CUTTING MACHINE.

967,456.  Specification of Letters Patent.  Patented Aug. 16, 1910.

Application filed December 30, 1909. Serial No. 535,558.

*To all whom it may concern:*

Be it known that I, WILLIS E. SMITH, a citizen of the United States, residing at Owensboro, in the county of Daviess and State of Kentucky, have invented certain new and useful Improvements in Tile-Cutting Machines, of which the following is a specification.

My present invention is a tile cutting machine, and my object is to provide a machine which will be practical and useful for the purpose of cutting burned clay tile of various thicknesses.

In the accompanying drawing, which illustrates my invention, Figure 1 is a side elevation of my improved machine. Fig. 2 is a vertical cross section therethrough on line 2—2 of Fig. 1, and, Fig. 3 is a similar view on line 3—3 of Fig. 1.

This machine, which I have found to be the only character of machine practical for the purpose, embodies a lower, main frame bar 10 having at one end an angular slotted extension 11, and having at its opposite end an L-shaped extension 12 forming a bracket and through which is tapped a thumb clamp 13 for attaching the machine upon a bench or scaffold plank. Adjacent its last-mentioned end, the bar 10 has rigidly secured thereto and upstanding therefrom a bracket arm 14, and adjacent said arm, a rigid apertured block 15. An upper frame bar 16 is pivotally secured to the upper end of bracket arm 14, substantially parallel with bar 10, the rear end of said bar 16 extending above the block 15, and the forward end thereof having an angular slotted extension 17 directly opposite the extension 11 of bar 10.

Mounted in the slots of extensions 11 and 17 are the cutting wheels 18, which are especially tempered steel disks, the disk in extension 17 being held therein by a stud-shaft 19 upon which it is mounted, and the disk in extension 11 being mounted upon the forward end of an operating shaft 20 extending longitudinally along the frame bar 10, through the aperture of block 15, and provided upon its rear end with a crank 21 by which it is manually rotated. Thus a tile may be fed between the cutting disks 18 by rotating shaft 20, and cut by the directly opposing edges of said disks. Further the disk 18 carried by the upper bar may be adjusted toward and away from the disk 18 of the lower bar, by means of a thumb screw 22 tapped through the bar 16 rearwardly of its fulcrum 23 and bearing upon the upper end of block 15.

I claim:

1. A machine for cutting tile comprising parallel frame bars having slotted angular extensions at one end directly opposing one another, cutting disks journaled in said extensions, a shaft journaled upon one of said frame bars, and upon one end of which the corresponding disk is held, said shaft having at its opposite end, a crank by which it is rotated, and means to adjust the other frame bar to vary the distance between said cutting disks.

2. A machine for cutting tile comprising a frame bar having at one end an angular slotted extension, and having at its opposite end means to secure it upon a suitable support, an operating shaft journaled parallel above said frame bar with its forward end journaled through said extension, and having a crank upon its rear end, a cutting disk upon the forward end of said shaft within said extension, a block adjacent the rear end of said frame bar and through which said shaft extends, a bracket arm rigidly secured to and upstanding from said frame bar forwardly of said block, an upper frame bar fulcrumed intermediate its ends upon said bracket arm, and extending parallel with said lower frame bar, with its rear end above said block thereof, and provided upon its forward end with a slotted angular extension, a cutting disk journaled in said extension and directly opposing the cutting disk of the lower frame bar, and a thumb screw tapped through the upper frame bar rearwardly of its fulcrum and bearing upon said block whereby to adjust the same and vary the distance between the cutting disks.

In testimony whereof I affix my signature in presence of two witnesses.

WILLIS E. SMITH.

Witnesses:
  J. F. SMITH,
  MARTYNE H. JONES.